Oct. 8, 1963     C. J. TENNYSON     3,106,035

HOLDING A FISH TO REMOVE HOOKS

Filed Feb. 26, 1962

INVENTOR

Curtis J. Tennyson

BY *Gustave Miller*

ATTORNEY

United States Patent Office 3,106,035
Patented Oct. 8, 1963

3,106,035
HOLDING A FISH TO REMOVE HOOKS
Curtis J. Tennyson, Orlando, Fla.
(P.O. Box 2261, Charleston, S.C.)
Filed Feb. 26, 1962, Ser. No. 175,762
4 Claims. (Cl. 43—53.5)

This invention relates to a fish mouth spreader and holder and has for an object to provide a simple and efficient device that may be operated by one hand for opening the mouth of a fish and spreading it and holding it open for the purpose of making it possible to readily remove a hook or bait from the mouth of a fish as well as for the purpose of enabling the fish to be placed on a string more readily without danger of the fish biting or otherwise injuring the hand of the fisherman.

A further object of this invention is to provide an improved fish mouth spreader and holder which may be used to provide a gentle opening and holding action on young or immature fish to hold them gently to enable the fish hook to be removed without injury so that the young fish may be released without injury and placed back in the water as required by many State conservation laws.

A further object of this invention, is to provide a fish mouth opening and holding device for use by a fisherman for holding the fish with its mouth in an open position to permit the safe removal of a fish hook from the fish, wherein the holding pressure may be either gentle or severe as desired by the fisherman according to whether it is a young fish easy to hold or a more mature fish of a type which is extremely difficult to hold.

Another object of this invention is to provide a fish mouth spreader and holder not only for fish but equally applicable with eels, turtles, etc. to hold the mouth in open position, to remove a hook, plug or artificial bait, accomplishing the holding with the use of one hand that needs never touch the fish, eels, turtles, etc., and thus avoid the danger of being bitten or finned as well as avoiding contact with the fish.

With the above and related objects in view, this invention consists in the details of construction and combination of parts, as will be more fully understood from the following description, when read in conjunction with the accompanying drawings in which.

Figure 1:
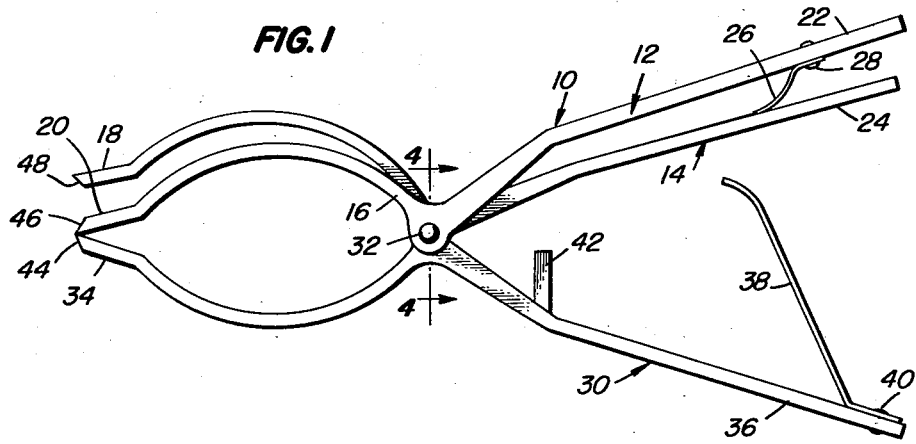
FIG. 1 is an elevational view of the fish mouth spreader and holder of this invention in position for inserting into a fish mouth.
Figure 2:
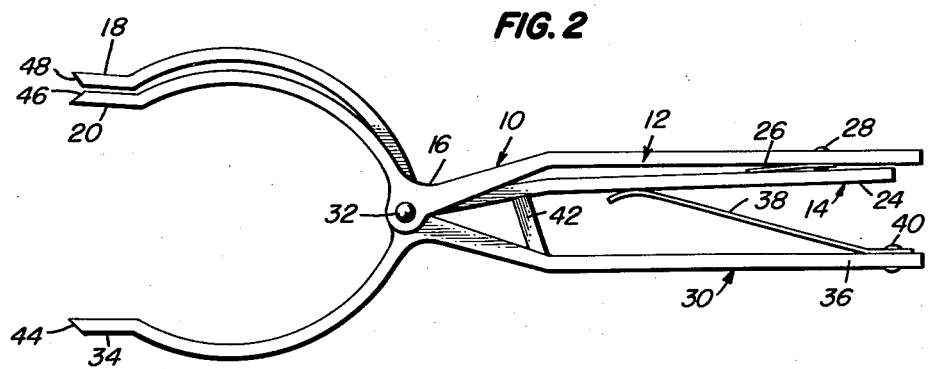
FIG. 2 is a similar view with the handles squeezed together.
Figure 3:
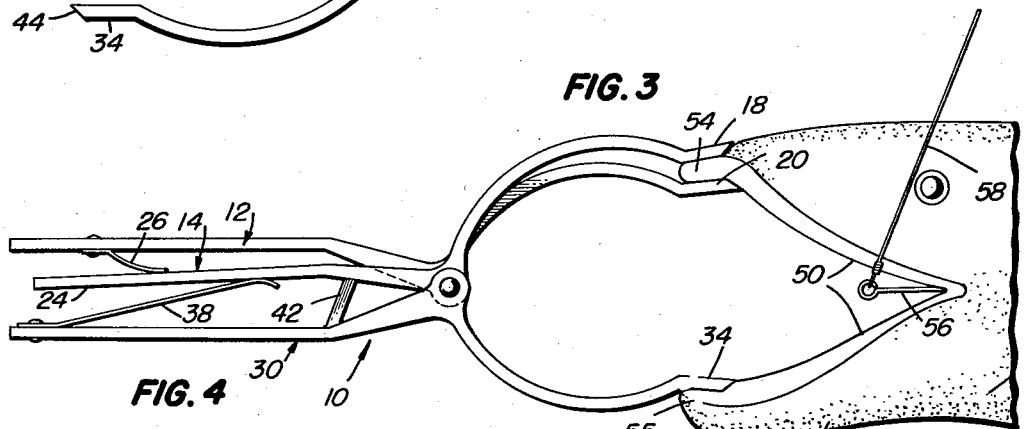
FIG. 3 is a similar view from the opposite side in fish mouth spreading and holding position.

There is shown at 10 the fish mouth spreader and holder of this invention. This spreader and holder consists of three plier levers shaped substantially as shown. Two of the plier levers 12 and 14 cross each other at their mediate pivot portions 16 and terminate in jaws 18 and 20 at one of their ends and a hand operable handle 22 and an operator end 24 at their other ends. Thus, as the handle 22 and operator end 24 approach each other, the jaws 18 and 20 approach each other, a light spring 26 being mounted between the handle 22 and operator end 24 as by being riveted at 28 through one of these two elements such as the handle 22.

The third plier lever 30 is likewise pivoted by the same pivot 32 through its mediate portion 16 which extends through the mediate portions 16 of the first two plier levers 12 and 14, but this plier lever 30 does not cross either of the first two plier levers 12 and 14, but instead its jaw 34 and its handle portion 36 remain on the same side of and angularly from the pivot 32 and mounted between the operator end 24 of plier lever 14 is a heavy spring means 38 here shown as being mounted by a rivet 40 to the end of the handle 36.

An abutment 42 is mounted between the operator end 24 of lever 14 and the handle 36 of lever 30. This abutment is so positioned that when the operator end 24 contacts the abutment 42, the jaw 18 is very close to the jaw 20 and the jaws 18 and 20 are at a maximum distance from the jaw 34.

The jaws 20 and 34 are beveled on their sides opposite from each other as at 44 and 46 while the other jaw 18 is beveled on the side adjacent jaw 20 as at 48. It will be noted moreover that the plier levers 12 and 14 are substantially complementary to each other except, of course, that they cross over each other while the plier lever 30 is a mirror image of the other two levers.

In operation, the bevels 44 and 46 facilitate inserting these two jaws 20 and 34 while in the position shown in FIG. 1 into the mouth of the fish, while the lip 54 of the fish 52 slips between the jaws 18 and 20. To facilitate gripping the fish 52 and fish lips 54 and 55, the jaws 18, 20 and 34 may be provided with friction increasing material on the surface thereof, such as rubber, abrasive, or the like.

When the jaws are thus placed on the fish, the handles 22 and 36 are squeezed together. This immediately causes the two jaws 20 and 34 to separate and open the mouth 50 of the fish 52 while the jaws 20 and 18 tend to squeeze and hold the lip 54 of the fish therebetween and between the three jaws 18, 20 and 34 to hold the entire fish 52 firmly and securely. As squeezing pressure on the handles is increased, the mouth 50 is opened wider and the lip 54 is held more firmly until, in the case of a large fish, the abutment 42 contacts the operator end 24 of lever 14, thus providing an unyielding bias toward the operator end 24 of lever 14 to press against the handle 22 of plier lever 11 and thus cause the two jaws 20 and 18 to grip the fish lip 54 firmly therebetween.

Figure 4:
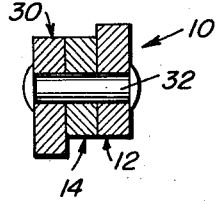
FIG. 4 is a sectional view through the mediate pivot portions on line 4—4 of FIG. 1.

In this position, the mouth 50 of the fish 52 is held open and the hook 56 on the fish line 58 can be safely removed from the mouth 50 of the fish 52. In the case of a small fish, much less pressure will be necessary and the mouth of the fish may be opened more gently, the heavy spring means 38 providing sufficient bias on the handle 24 of the plier lever 14 so that the fish hook may be released therefrom and the young fish may be returned substantially uninjured back to the water, as required by conservation laws of many states. It will also be noted, as illustrated in FIG. 4, that the mediate portion of lever 14 is located on pivot 32 between the mediate portions of the levers 12 and 30.

As a result of the construction thus described, a big or small fish may be held with the proper degree of firmness and even an eel or turtle or other types of fish can be held safely without danger of being bitten or finned by the fish and the fish will be held so that the hook may be readily removed and the fish may be placed on a string for safekeeping in the usual manner.

Although this invention has been described in considerable detal, such description is intended as being illustrative rather than limiting, since the invention may be variously embodied, and the scope of the invention is to be determined as claimed.

Having thus set forth and disclosed the nature of this invention, what is claimed is:

1. A fish mouth spreader and holder comprising first, second and third levers, each lever having a jaw at one end, a handle portion at the other end and a mediate portion therebetween, said levers all being pivotally joined by a pivot pin through said mediate portions, said levers extending in substantially a common plane, the first and second levers crossing each other at their mediate portions whereby they function as a pair of pliers, the jaws and handle of the third lever being located to one side of the jaws and handles of the first and second levers whereby the jaws of the first and third levers form the outer jaws and the handles of the second and third levers form the outer handles, a light spring means being mounted on one of said first and second lever handles and being disposed therebetween to lightly bias the first and second jaws apart from an adjacent closed position, a heavy spring means being mounted on one of said first and third handle portions and disposed therebetween to heavily bias said first and third jaws from fully open or apart position whereby when the second and third jaws are placed between the lips of a fish and the second and third handle portions are initially manually squeezed together, the bias of the heavy spring will overcome the bias of the light spring and cause the first and second jaws to clamp one lip of the fish therebetween and continued progressive squeezing of the second and third handles will overcome the bias of the heavy spring and cause the second and third jaws to separate the lips of the fish.

2. The fish mouth spreader and holder of claim 1, characterized further by the fact that an abutment means is located on either the first or third handle portions and located therebetween to limit the separation of said first and third jaws.

3. A fish mouth spreader and holder of claim 1, said fish mouth spreader jaws being beveled toward each other on their remote sides to facilitate their entry into a fish mouth.

4. A fish mouth spreader and holder of claim 1, all said jaws having friction increasing means increasing their fish mouth and lip holding effect.

References Cited in the file of this patent
UNITED STATES PATENTS

| | | |
|---|---|---|
| 579,625 | Willbrandt | Mar. 30, 1897 |
| 2,603,829 | Siskoff | July 22, 1952 |
| 2,867,937 | Little | Jan. 13, 1959 |
| 3,012,360 | Creel et al. | Dec. 12, 1961 |